(12) United States Patent
Williams et al.

(10) Patent No.: US 7,323,804 B2
(45) Date of Patent: Jan. 29, 2008

(54) LINEAR OUTPUT, CLOSED LOOP MOVER ASSEMBLY

(75) Inventors: Eric C. Williams, Los Alamos, NM (US); David F. Arnone, Mountain View, CA (US); Manish Sharma, Cupertino, CA (US)

(73) Assignee: Bookham Technology plc, Northamptonshire (GB)

( * ) Notice: Subject to any disclaimer, the term of this patent is extended or adjusted under 35 U.S.C. 154(b) by 244 days.

(21) Appl. No.: 10/829,413

(22) Filed: Apr. 21, 2004

(65) Prior Publication Data

US 2004/0212279 A1 Oct. 28, 2004

Related U.S. Application Data

(60) Provisional application No. 60/464,875, filed on Apr. 22, 2003.

(51) Int. Cl.
*H01L 41/08* (2006.01)
(52) U.S. Cl. .................................. 310/323.02
(58) Field of Classification Search ................. 310/328, 310/316, 323, 311, 323.02, 323.03
See application file for complete search history.

(56) References Cited

U.S. PATENT DOCUMENTS

| | | | |
|---|---|---|---|
| 3,709,621 A | | 1/1973 | Wake |
| 4,560,263 A | * | 12/1985 | Katsuma et al. ............ 396/133 |
| 5,053,685 A | | 10/1991 | Bacchi |
| 5,237,238 A | | 8/1993 | Berghaus et al. |
| 5,410,206 A | * | 4/1995 | Luecke et al. .............. 310/328 |
| 6,064,140 A | * | 5/2000 | Zumeris ................. 310/323.02 |
| 6,512,321 B2 | * | 1/2003 | Yoshida et al. ......... 310/316.01 |
| 6,528,926 B2 | * | 3/2003 | Okamoto et al. ....... 310/323.17 |
| 6,611,080 B2 | * | 8/2003 | Ngol et al. ............. 310/323.02 |
| 6,707,231 B2 | * | 3/2004 | Pease et al. ................. 310/317 |
| 6,911,763 B2 | * | 6/2005 | Ziegler et al. .......... 310/323.02 |
| 6,940,209 B2 | * | 9/2005 | Henderson ............. 310/323.02 |
| 7,170,214 B2 | * | 1/2007 | Henderson et al. ..... 310/323.02 |

OTHER PUBLICATIONS http://www.thorlabs.com/Thorcat/6300/6385-D02.pdf.
Notification Concerning Transmittal of Copy of International Preliminary Report on Patentability /PCT Written Opinion of the International Searching Authority.

* cited by examiner

*Primary Examiner*—Mark Budd
(74) *Attorney, Agent, or Firm*—Steven G. Roeder; James P. Broder (57) ABSTRACT

A mover assembly (16) that moves or positions an object (12) along a first axis includes a motor (20) and a coupling assembly (22). The motor (20) includes a motor output (332) that is moved along the first axis and about the first axis. The coupling assembly (22) includes a stage (344) that couples the motor output (332) to the object (12) and a stage guide (346) that guides the motion of the stage (344) along the first axis. In one embodiment, the stage guide (346) is a linear bearing that allows for motion of the stage (344) along the first axis and inhibits motion of the stage (344) about the first axis, along a second axis and along a third axis. Additionally, the coupling assembly (22) can include a measurement system (28) that monitors the movement of the stage (344).

19 Claims, 7 Drawing Sheets

LINEAR OUTPUT, CLOSED LOOP MOVER ASSEMBLY

RELATED APPLICATIONS

This application claims priority on Provisional Application Ser. No. 60/464,875 filed on Apr. 22, 2003 and entitled "LINEAR OUTPUT, HIGH ACCURACY, CLOSED LOOP MOTOR ASSEMBLY". As far as is permitted, the contents of Provisional Application Ser. No. 60/464,875 are incorporated herein by reference.

BACKGROUND

Micromotors are used to make fine adjustments to the position and/or shape of an object. One type of micromotor assembly includes a rotating and translating output shaft and a rotary encoder near the rotating output shaft that provides position feedback for closed-loop control of the micromotor.

However, in certain embodiments, the rotating output shaft is not desirable. Further, screw pitch errors and runout (wobble) can significantly degrade the accuracy of the rotary encoded device.

SUMMARY

The present invention is directed to a mover assembly that moves or positions an object along a first axis. In one embodiment, the mover assembly includes a motor and a coupling assembly. The motor includes a motor output that is moved along the first axis and about the first axis. The coupling assembly includes a stage that couples the motor output to the object and a stage guide that guides the motion of the stage along the first axis. In one embodiment, the stage guide is a bearing, such as a linear bearing that allows for motion of the stage along the first axis and inhibits motion of the stage about the first, second and third axes, and along the second axis and along the third axis.

In one embodiment, the coupling assembly includes a measurement system that provides measurement information. The measurement system can be a linear encoder that includes a first component that is secured to and moves with the stage. Stated another way, the first component is coupled to the guide. With this design, the linear encoder provides feedback physically close to the stage. The linear encoder feedback allows for compensation for position errors emanating from the motor.

In one embodiment, the mover assembly is a closed-loop actuator in a relatively small package. Because of the nature of coupling and the choice of the guide and encoder, the overall form factor of the complete mover assembly can be minimized. In an alternative embodiment, the mover assembly can operate open loop.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
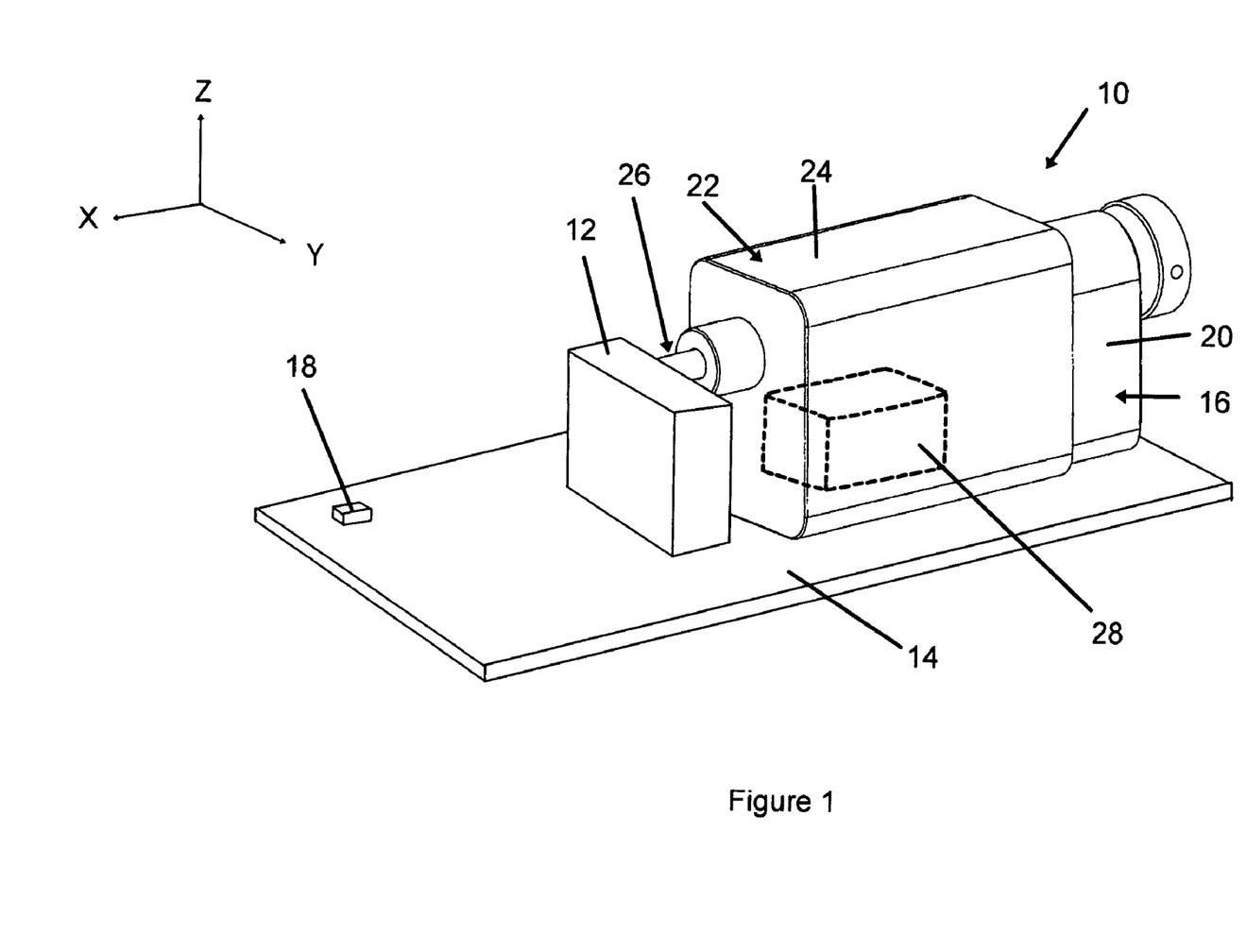
FIG. 1 is a perspective illustration of an apparatus that utilizes a mover assembly having features of the present invention.

FIG. 1 illustrates a precision apparatus 10 having features of the present invention, that makes fine adjustments to the position and/or shape of an object 12. In this embodiment, the precision apparatus 10 includes an apparatus frame 14, a mover assembly 16 and a control system 18 that directs current to the mover assembly 16 and controls the operation of the apparatus 10. A number of Figures include an orientation system that illustrates an X axis, a Y axis that is orthogonal to the X axis, and a Z axis that is orthogonal to the X and Y axes. It should be noted that these axes can also be referred to as the first, second, and third axes. In general, there are six degrees of freedom, including translation along the X, Y and Z axes and rotation about the X, Y and Z axes.

The design of the components of the apparatus 10 and the type of apparatus 10 can be varied. For example, the apparatus 10 can be used in manufacturing, technical or scientific instruments including lasers, interferometers, mirrors, lenses, telescopes, filters, emitters or detectors. Stated somewhat differently, the mover assembly 16 can be used in connection with manufacturing, technical or scientific instruments including lasers, interferometers, mirrors, lenses, and telescopes. As examples, the object 12 can be a portion or all of a laser, interferometer, mirror, lens, telescope, mask, reticle, filters, emitters or detectors.

The apparatus frame 14 is rigid and supports the other components of the apparatus 10. In one embodiment, the apparatus frame 14 is connected to the mover assembly 16 at only one location.

The mover assembly 16 is coupled to the object 12. In one embodiment, the mover assembly 16 has a relatively low mass, small size, high load capability, wide operating temperature range, and/or low power consumption. The mover assembly 16 can provide adjustment with a resolution of about 30 nanometers or less over a range of at least +/−0.1 mm. In alternative embodiments, the adjustment resolution can be greater or less than 30 nanometers and/or the range of travel can be greater or less than +/−0.1 mm.

In FIG. 1, the mover assembly 16 includes a motor 20 and a coupling assembly 22 that couples the motor 20 to the object 12. In one embodiment, the coupling assembly 22 includes an assembly frame 24, a mechanical filter 26, and a measurement system 28 (illustrated in phantom). The design and orientation of these components can be changed to suit the requirements of the mover assembly 16. Further, one or more of these components can be optional. For example, in one embodiment, the coupling assembly 22 does not include the measurement system 28.

In one embodiment, the coupling assembly 22 receives a rotating and linear movement of the motor 20 and transfers that motion into a non-rotating, linearly translating movement. With this design, the coupling assembly 22 passes axial motion while decoupling the other 5 degrees of motion.
}

More specifically, the coupling assembly 22 passes motion along the X axis, and inhibits motion along the Y and Z axes and about the X, Y, and Z axes. Alternatively, the coupling assembly 22 can receive a purely linear movement of the motor 20.

In FIG. 1, the coupling assembly 22 is an add on module that is coupled to the motor 20. Alternatively, for example, the coupling assembly 22 can be integrated into the motor 20.

The measurement system 28 allows for closed loop control of the motor 20. For example, the measurement system 28 can monitor the position of a portion of the mover assembly 16 and provide the information to the control system 18. Additionally or alternatively, the measurement system 28 can include one or more sensors (not shown) that also monitor the position or shape of the object 12 and provide the information to the control system 18.

The control system 18 receives information regarding the position of the object 12 or a portion of the mover assembly 16 and directs a drive signal to the motor 20 to make fine adjustments to the position and/or shape of the object 12. The control system 18 can include one or more processors. In FIG. 1, the control system 18 is positioned away from the mover assembly 16. Alternatively, the control system 18 can be incorporated into the mover assembly 16.

Figure 2:
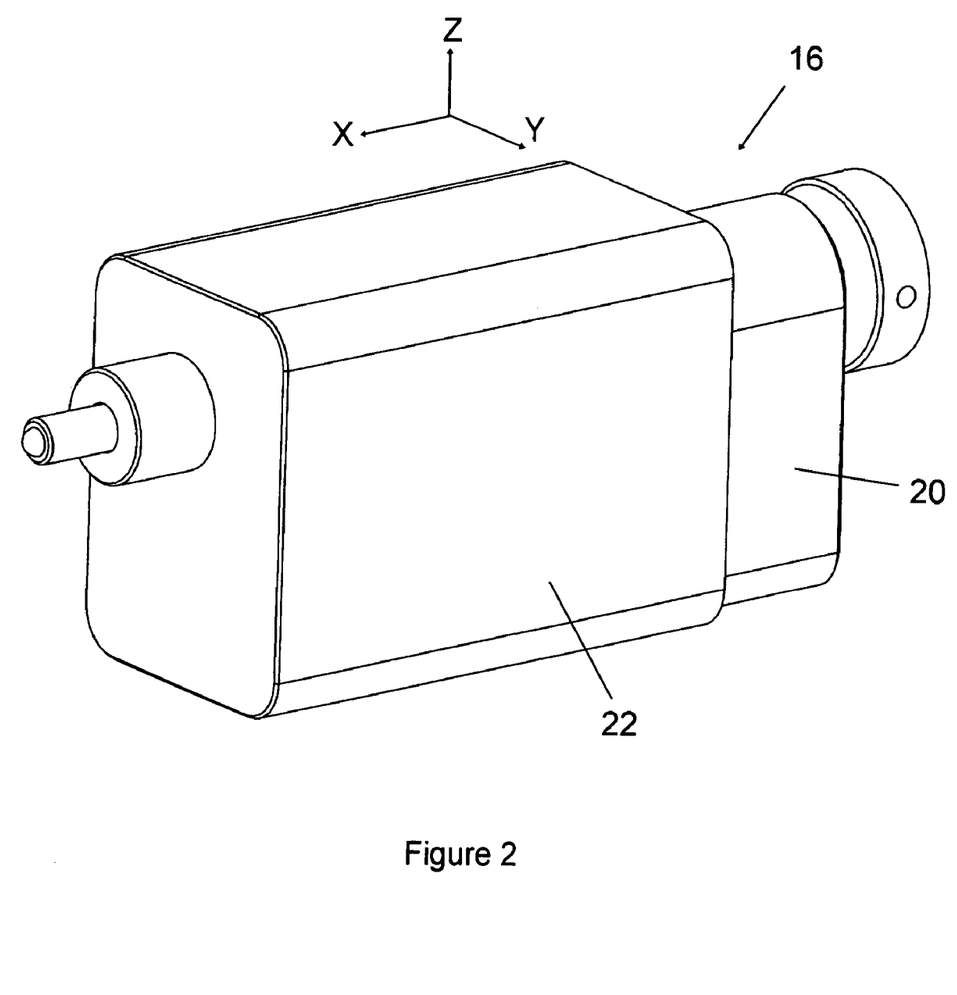
FIG. 2 is a perspective view of the mover assembly of FIG. 1.

FIG. 2 is a perspective view of the mover assembly 16 of FIG. 1, including the motor 20 and the coupling assembly 22.

Figure 3A:
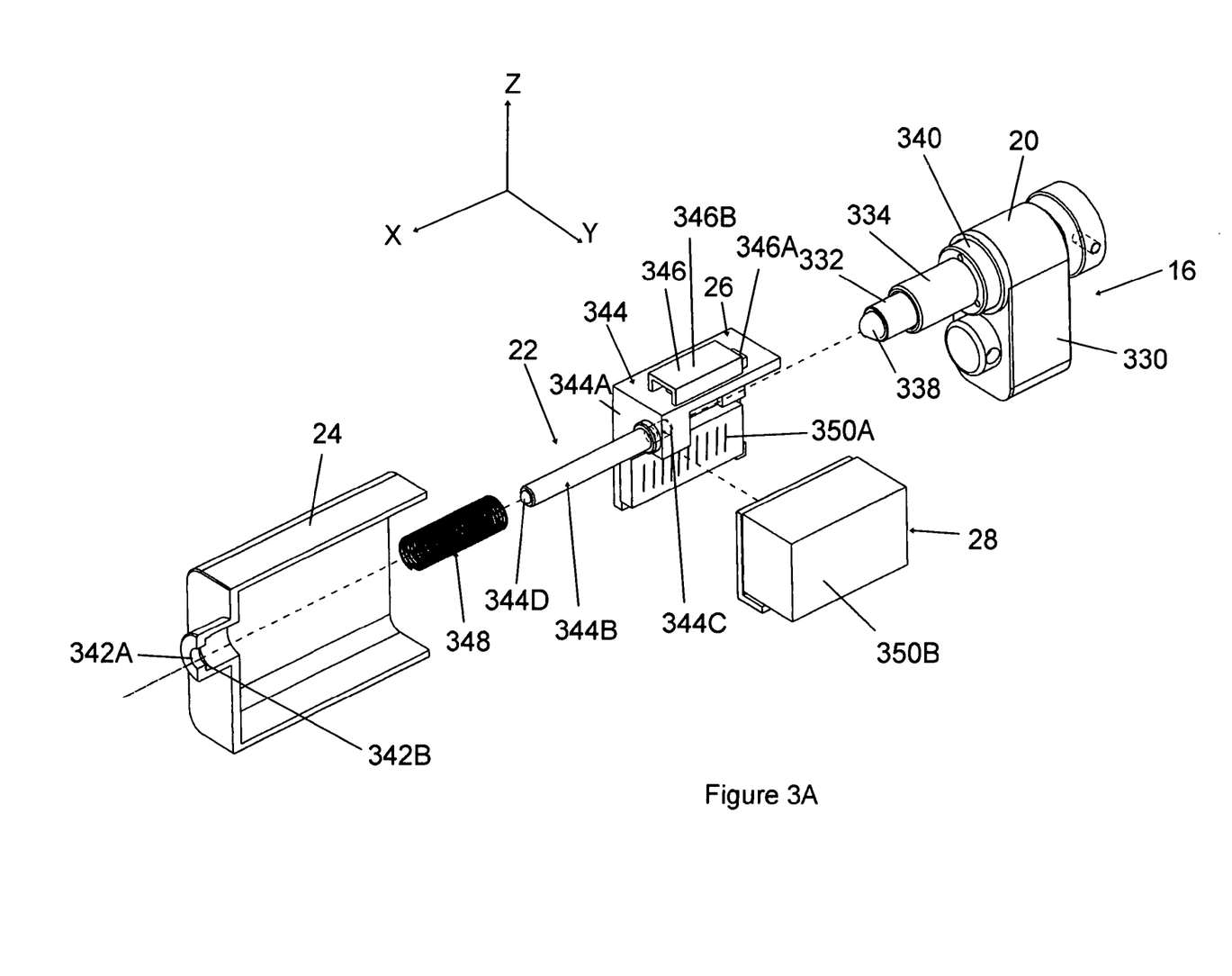
FIG. 3A is a partly cutaway, exploded first perspective view of the mover assembly of FIG. 2.
Figure 3B:
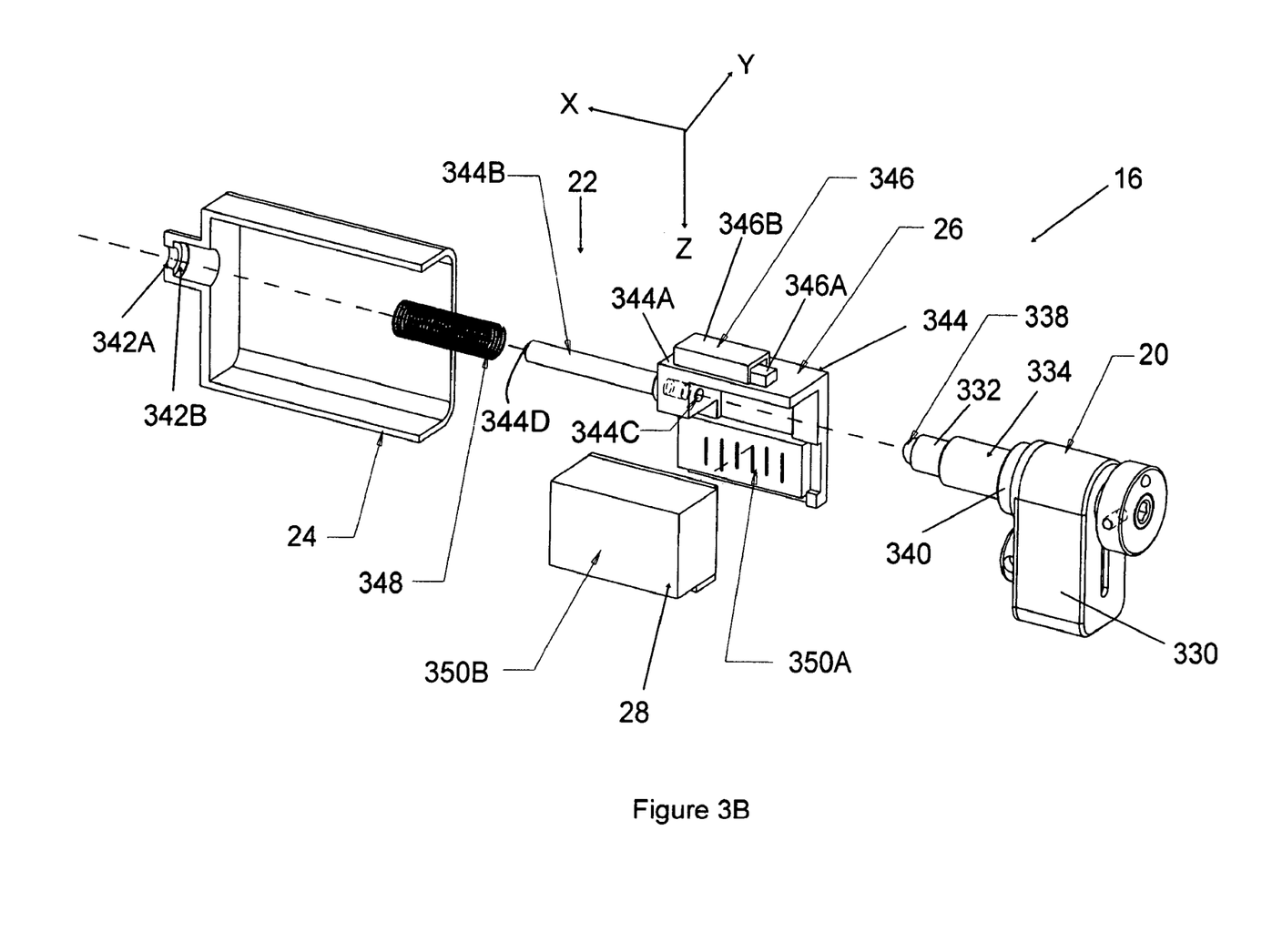
FIG. 3B is a partly cutaway, exploded second perspective view of the mover assembly of FIG. 2.

FIGS. 3A and 3B are alternative, partly cutaway, exploded perspective views of the mover assembly 16 of FIG. 2. More specifically, FIGS. 3A and 3B illustrate the motor 20 and the coupling assembly 22 in more detail.

The design of the motor 20 can be varied to suit the design requirements of the mover assembly 16. In one embodiment, the motor 20 includes a motor housing 330, a motor output 332, an output guide 334, and an actuator 436 (illustrated in FIG. 4A). The design, size, shape and/or orientation of one or more of these components can be changed to suit the design requirements of the mover assembly 16. Additionally, for example, the motor can include a rotary encoder (not shown) that monitors the rotation of the mover output 332.

The motor housing 330 retains or encloses one or more of the components of the motor 20. In FIGS. 3A and 3B, the motor housing 330 is a rigid cover that encircles the actuator 436. The motor housing 330 is directly secured to the coupling assembly 22 or the apparatus frame 14 (illustrated in FIG. 1).

The motor output 332 is coupled, contacting and/or connected to the mechanical filter 26. In one embodiment, the motor output 332 is rotated about the X axis and is moved laterally along the X axis by the actuator 436 and the output guide 334. In FIGS. 3A and 3B, the mover output 332 is generally cylindrical shaped shaft and includes a proximal shaft end (not shown) and a distal shaft end. In this embodiment, a portion of the outer circumference of the motor output 332 includes an externally threaded surface (not shown). In one embodiment, the majority of the outer circumference includes an 80 pitch externally threaded surface. Alternatively, the entire outer circumference can include the externally threaded surface, or only a small portion of the outer circumference can include the externally threaded surface. It should also be noted that the pitch of the externally threaded surface can be greater than 80 pitch or less than 80 pitch.

In one embodiment, the motor output 332 includes an output frictional contact area (not shown) that is engaged by the actuator 436. With this design, movement of the actuator 436 results in rotation of the motor output 332. In one embodiment, the output frictional contact area is an externally threaded area. In an alternative embodiment, the output frictional contact area is a roughened or a smooth area.

Additionally, the motor output 332 can include a ball bearing 338 that fits in an aperture at the distal shaft end. With this design, the motor output 332 has a rounded tip. The ball bearing 338 engages the mechanical filter 26 to transfer the linear movement of the motor output 332 to the mechanical filter 26. Further, the ball bearing 338 assists in inhibiting rotation of the motor output 332 from causing rotation of the mechanical filter 26. In another embodiment, the distal shaft end can be substantially flat or have another shape as needed. In one embodiment, the motor output 332 is made stainless steel or other hard material.

The output guide 334 supports the motor output 332, guides the motor output 332 and causes rotation of the motor output 332 by the actuator 436 to result in motion of the motor output 332 along the X axis. In FIGS. 3A and 3B, the output guide 334 receives the motor output 332 and includes a generally tubular shaped housing having an annular shaped mounting flange 340 that is fixedly secured to the motor housing 330 and an internally threaded surface (not shown).

The internally threaded surface is designed to engage the externally threaded surface of the motor output 332. With this design, rotation of the motor output 332 with the actuator 436 about the X axis causes the motor output 332 to move transversely along the X axis relative to the output guide 334 and the rest of the mover assembly 16.

Figure 4A:
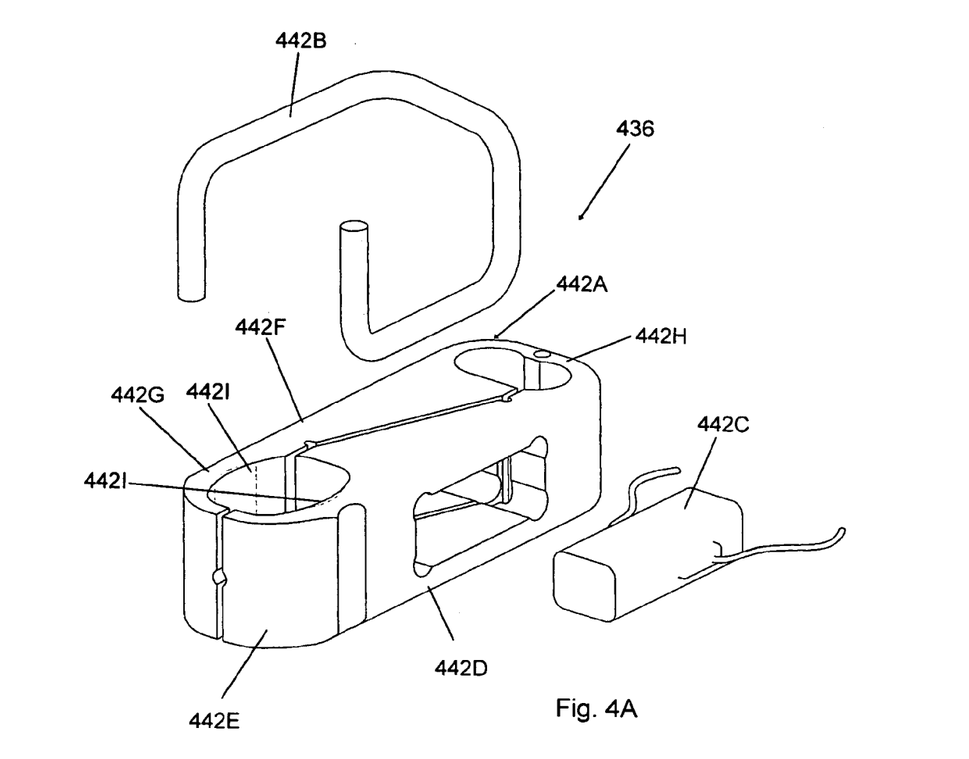
FIG. 4A is an exploded perspective view of an actuator having features of the present invention.

The actuator 436 rotates the motor output 332. The design of the actuator 436 can be varied. FIG. 4 illustrates an exploded perspective view of one embodiment of the actuator 436. In this embodiment, the actuator 436 includes an actuator frame 442A, an actuator resilient connector 442B and a piezoelectric element 442C.

The actuator frame 442A is somewhat rectangular shaped and includes (i) a first frame section 442D having a first jaw element 442E, (ii) an adjacent second frame section 442F having a second jaw element 442G, and (iii) a frame base 442H that secures the frame sections 442D, 442F together. The jaw elements 442E, 442G are adjoining and cooperate to fit about the output frictional contact area of the motor output 332. In one embodiment, each of the jaw elements 442E, 442G includes an inward facing frictional contact area 442I that engages the output frictional contact area of the motor output 332. In one embodiment, each of the frictional contact areas 442I is a partly internally threaded region. The threads of the partly threaded region of the jaw elements 442E, 442G act together to engage the output frictional contact area of the motor output 332 between the jaw elements 442E, 442G. Stated another way, the internal faces of the jaw elements 442E, 442G are threaded to accommodate the output frictional contact area of the motor output 332. In an alternative embodiment, for example, the frictional contact area 442I is a roughened area that engages the motor output 332.

The actuator resilient connector 442B urges the jaw elements 442E, 442G against the motor output 332. Stated another way, the actuator resilient connector 442B urges the jaw elements 442E, 442G together so that the jaw elements 442E, 442G maintain contact with the motor output 332. The actuator resilient connector 442B may be fashioned from any material having suitable spring and fatigue characteristics.

The piezoelectric element 442C is mounted within the actuator frame 442A. In FIG. 4, a first end of the piezoelectric element 442C is affixed to the frame base 442H and an opposite second end of the piezoelectric element 442C is affixed to a first frame section 442D. The piezoelectric element 442C has electrodes at the opposite ends. The control system 18 (illustrated in FIG. 1) is electrically connected to the respective electrodes. With this design, the control system 18 can selectively apply a drive signal across the piezoelectric element 442C. The internal structure of piezoelectric element 442C may actually contain a plurality of interconnected electrodes so as to reduce the voltage required to operate the piezoelectric element 442C.

The drive signal causes the length of the piezoelectric element 442C to change. For example, as the amplitude of the drive signal across the piezoelectric element 442C increases, the length increases, and as the amplitude of the drive signal across piezoelectric element 442C decreases, the length decreases. Thus, the control system 18 actively controls the length of the piezoelectric element 442C.

With the design provided herein, sequentially lengthening and shortening of the piezoelectric element 442C causes the first jaw element 442E to sequentially move relative to the second jaw element 442G. Assuming that no slippage occurs between the jaw elements 442E, 442G and the motor output 332, rotation of motor output 332 occurs. Stated another way, the control system 18 can direct electrical energy to the piezoelectric element 442C to cause reciprocating motion of the abutting jaw elements 442E, 442G in somewhat parallel paths.

The control system 18 applies a cyclic electrical signal having the proper waveform and polarity to rotate the motor output 332. More specifically, the control system 18 sequentially directs (i) a peak voltage to the piezoelectric element 442C that causes the piezoelectric element 442C to lengthen and relative movement of the jaw elements 442E, 442G in a first direction and (ii) a baseline voltage that allows the piezoelectric element 442C to shorten and relative movement of the jaw elements 442E, 442G in an opposite second direction.

The reciprocating motion of the jaw elements 442E, 442G against the motor output 332 is converted to simple rotary motion of the motor output 332 by moving the jaw elements 442E, 442G relatively slowly in the first direction such that the coefficient of friction between the motor output 332 and the jaw elements 442E, 442G overcomes inertia of the motor output 332. Engagement is maintained between the jaw elements 442E, 442G and the motor output 332 incrementally rotates. Motion of the jaw elements 442E, 442G in the second direction is relatively fast, such that the inertia of the motor output 332 prevents it from following the motion of the jaw elements 442E, 442G and the motor output 332 slips in the jaw elements 442E, 442G, preserving the preceding incremental motion. The result is a stepwise, incremental rotation of the motor output 332.

The duration of slippage depends on the waveform and amplitude of the electrical signal applied across the piezoelectric element 442C, as well as the mechanical characteristics of the system, such as the frictional engagement between jaw elements 442E, 442G and the motor output 332, the inertia of the motor output 332 and other mechanical elements connected to it.

Rotational motion of the motor output 332 in the reverse direction is accomplished by simply interchanging the speeds of the motion in the first and second directions. Stated another way, selective rotation of motor output 332 may be obtained in either direction by applying a cyclic electrical signal having the proper waveform and polarity. Accordingly, to rotate the motor output 332 in a first rotational direction, the control system 18 directs a cyclic signal having a slowly rising waveform followed by a rapidly falling waveform. Conversely, to rotate the motor output 332 in the opposite second rotational direction, the control system 18 directs a cyclic signal having a rapidly rising waveform followed by a slowly falling waveform.

One example of an actuator which may be used are those sold under the trade name "New Focus Picomotor" available from New Focus, Inc., San Jose, Calif. Other actuators include magnetostrictive actuators such as those available from Energen and piezoactuators. One embodiment of an actuator is described in U.S. Pat. No. 5,410,206, issued to Luecke et al. and assigned to New Focus, Inc., the contents of which are incorporated herein by reference.

Figure 4B:
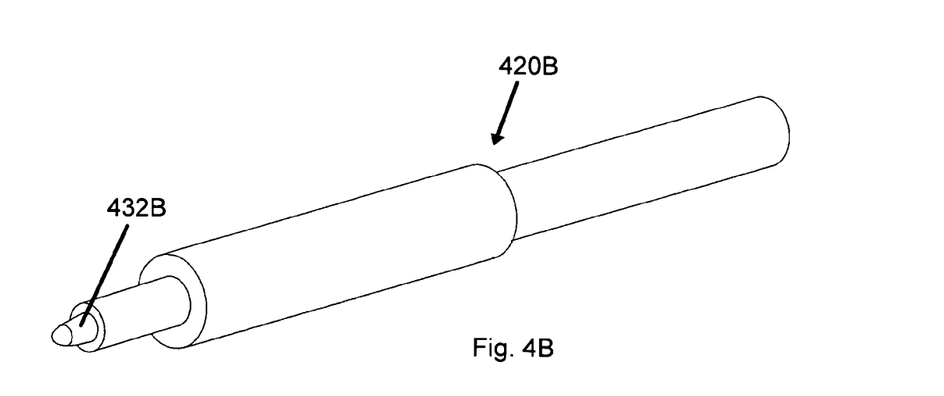
FIG. 4B is a perspective view of another embodiment of a mover.

FIG. 4B is a perspective view of another embodiment of a motor 420B having features of the present invention. In this embodiment, the motor 420B includes a motor output 432B that is rotated and moved laterally. A stepper motor (not shown), for example, can be used to move the motor output 432B. A suitable motor is sold by Thorlabs, Inc., located in Newton, N.J. Moreover, other types of motorized micrometers can be used. Other motors can be purchased from ThermoOriel, located in Stratford, Conn. or Newport Corporation, located in Irvine, Calif.

Referring back to FIGS. 3A and 3B, as stated above, the coupling assembly 22 includes the assembly frame 24, the mechanical filter 26 and the measurement system 28. The design of these components can be varied.

The assembly frame 24 retains and encloses one or more of the components of the coupling assembly 22. In FIGS. 3A and 3B, the assembly frame 24 is rigid, generally rectangular box shaped, and encircles the measurement system 28 and a portion of the mechanical filter 26. The assembly frame 24 is fixedly secured to the motor 20 and/or the apparatus frame 14. In FIGS. 3A and 3B, the assembly frame 24 includes an output opening 342A and a retractor stop 342B. In FIGS. 3A and 3B, the output opening 342A that is a circular shaped opening and the retractor stop 342B is a cylindrical shaped cavity that receives a portion of the mechanical filter 26.

The mechanical filter 26 receives the linear and/or rotating movement of the motor output 332 and transfers that motion into a non-rotating, linearly translating movement. With this design, the mechanical filter 26 passes axial motion, e.g. along the X axis, while decoupling the other 5 degrees of motion, e.g. along the Y and Z axes and about the X, Y, and Z axes. In one embodiment, the mechanical filter 26 includes a stage 344, a stage guide 346, and a retractor 348.

The stage 344 includes (i) a stage body 344A and (ii) a filter output 344B that is secured to the stage body 344A, moves with the stage body 344A and cantilevers away from the stage body 344A. In FIGS. 3A and 3B, the stage body 344A has a somewhat "L" shaped cross-section. The stage body 344A includes contact pad 344C that engages the motor output ball 338. In one embodiment, the contact pad 344C is made of sapphire, or other hard material and interfaces with the motor output ball 338.

The filter output 344B is generally rod shaped and includes a distal end that extends through the output opening 342A and a proximal end that is fixedly secured to the stage body 344A. In this embodiment, the stage body 344A and the filter output 344B are moved only linearly back and forth along the X axis. Additionally, the filter output 344B can include a ball bearing 344D that fits in an aperture at the distal end. The ball bearing 344D engages the object 12 to transfer the linear movement of the stage 344 to the object 12. In another embodiment, the distal end can be substantially flat or have another shape as needed. In one embodiment, the filter output 344B is made stainless steel or other hard material. In one embodiment, the filter output 344B is coaxial with the motor output 332 and the contact pad 344C. In this embodiment, the filter output 344B, the motor output 332 and the contact pad 344C are aligned along the X axis and move concurrently along the X axis.

However, the axis of the motor output 332 need not be parallel or co-axial to the filter output 344B. In another embodiment, the motor output 332 movement along one axis can be turned using a pivoting element so as to drive the filter output 344B along a different axis. Such a pivot element can also provide a mechanical advantage increasing force and reducing minimum incremental motion.

The stage guide 346 guides the motion of the stage 344 along the X axis relative to the assembly frame 24. Stated another way, the stage guide 346 allows the stage 344 to smoothly move relative to the assembly frame 24 linearly along the X axis and inhibits motion of the stage 344 relative to the assembly frame 24 along the Y and Z axes and about the X, Y, and Z axes. In one embodiment, the stage guide 346 is a bearing, such as a linear bearing that includes a first bearing component 346A that is secured to the mechanical filter 26 and a second bearing component 346B that is secured to the assembly frame 24. A suitable linear bearing is sold by IKO Nippon Thomson Ltd., located in Tokyo, Japan.

In an alternative embodiment, the stage guide 346 is a plane type bearing that includes a bushing. In this design, the bushing has an opening for receiving a portion of the stage 344 or another shaft. Further, in this design, if the bushing opening is circular, the stage guide 346 can include a notch or other anti-rotation device that inhibits rotation of the stage 344. Alternatively, for example, the bushing opening can be rectangular shaped.

Still alternatively, for example, the stage guide 346 can include a compliant axial guide that has a high torsional stiffness, such as metal bellows.

The retractor 348 urges the stage 344 against the motor output ball 338 and causes the contact pad 344C of the stage 344 to always be in contact with and engage the motor output ball 338. As examples, the retractor 348 can be a spring or another type of resilient member. In FIGS. 3A and 3B, the retractor 348 is a spring that encircles the filter output 344B and includes a distal end that engages the retractor stop 342B of the assembly frame 24 and a proximal end that engages the stage body 344A.

The measurement system 28 provides positional feedback for closed-loop control of the mover assembly 16. The design of the measurement system 28 can be varied. For example, the measurement system 280 can include one or more sensors. In one embodiment, the measurement system 28 directly monitors the position of the stage 344 and provides information regarding the movement and/or position of the stage 344 to the control system 18 so that the control system 18 can accurately direct current to the motor 20 to precisely control the position of the filter output 344B.

In one embodiment, the measurement system 28 is a linear encoder that includes an encoder first component 350A that is secured to and moves with the stage 344, and an encoder second component 350B that is secured to the assembly frame 24. With this design, the encoder first component 350A is coupled to the assembly frame 24 via the stage guide 346.

In one embodiment, one of the encoder components 350A, 350B includes an encoder glass scale and the other encoder component 350B, 350A is an encoder head. Further, the encoder second component 350B is positioned near and adjacent to the encoder first component 350A. In FIGS. 3A and 3B, the encoder first component 350A is the encoder glass scale and the encoder second component 350B is the encoder head. In this embodiment, the encoder head includes a light source and sensor. Further, the encoder head detects the motion of the encoder glass scale and the stage 344 relative to the encoder head. With this design, the measurement system 28 provides linear encoder feedback that is physically close to the filter output 344B. Because of the physical proximity of the measurement system 28 to the filter output 344B, any differential thermal expansion effects can be minimized by selecting the appropriate materials. This leads to a more thermally stable and accurate device. Components for a suitable measurement system 28 can be obtained from Heidenhain, located in Germany, or from MicroE Systems, located in Natick, Mass.

The mover assembly 16 offers several advantages over existing actuators. In certain embodiments, the mover assembly 16 provides a high-end closed-loop actuator in a small package. Because of the nature of coupling (ball+sapphire pad) and the choice of the linear bearing and encoder, the overall form factor of the complete device can be minimized. Further, the invention provides a very accurate, high-resolution linear motor with non-rotating output.

Figure 5A:
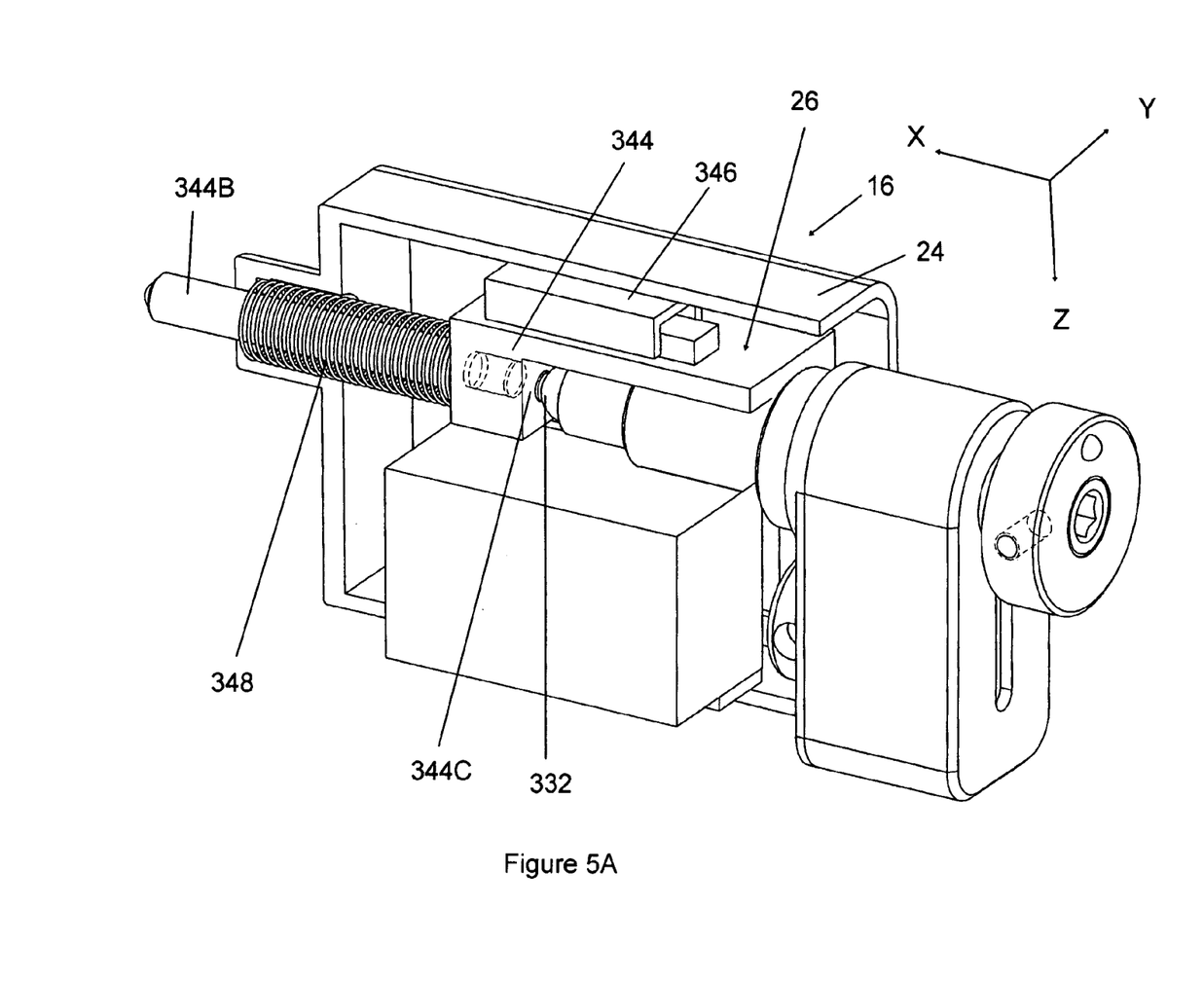
FIG. 5A is a partly cutaway perspective view of the mover assembly of FIG. 2.
Figure 5B:
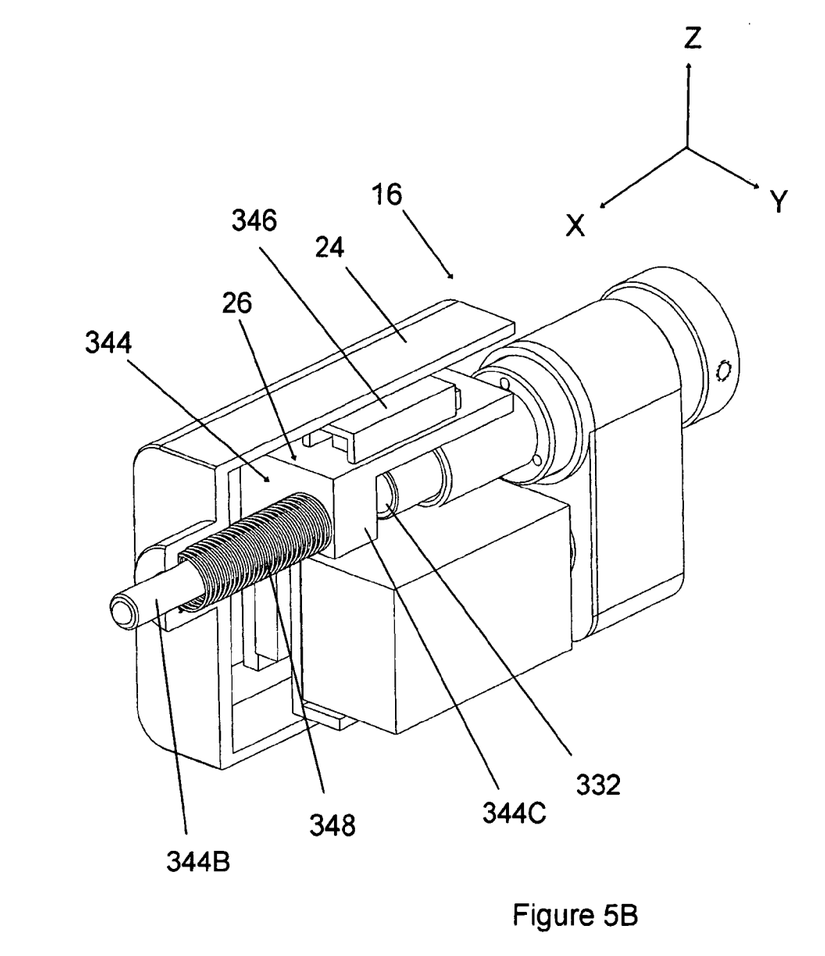
FIG. 5B is an alternative, partly cutaway perspective view of the mover assembly of FIG. 2.

FIGS. 5A and 5B are alternative, partly cutaway perspective views of the mover assembly 16 of FIG. 2. FIGS. 5A and 5B illustrate that the motor output 332 engages the contact pad 344C and the retractor 348 urges the stage 344 against the motor output 332. With this design, the motor output 332 which rotates about the X axis and is moved along the X axis is translated by the mechanical filter 26 to purely linear motion of the filter output 344B along the X axis. Further, FIGS. 5A and 5B also illustrate that the stage guide 346 couples the stage 344 to the assembly frame 24.

While the particular mover assembly 16 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A mover assembly that adjusts a position or shape of an object along a first axis, the mover assembly comprising:
   a motor including a motor output that moves along the first axis and about the first axis in a step-like fashion; and
   a coupling assembly including a stage that couples the motor output to the object and a stage guide that guides the motion of the stage along the first axis and inhibits motion of the stage about a second axis that is orthogonal to the first axis.

2. A mover assembly that adjusts a position or shape of an object along a first axis, the mover assembly comprising:
   a motor including a motor output that moves; and
   a coupling assembly including a stage that couples the motor output to the object and a stage guide that guides the motion of the stage along the first axis, wherein the motor output is moved along the first axis and about the first axis and wherein the stage guide is a linear bearing that allows for motion of the stage along the first axis and inhibits motion of the stage about the first, about a second and third axes, along the second axis and along the third axis.

3. A mover assembly that adjusts a position or shape of an object along a first axis, the mover assembly comprising:

a motor including a motor output that moves and a pair of opposed jaw elements that engage the motor output, wherein the motor includes a piezoelectric element that causes rotation of the motor output by moving the jaw elements relative to each other; and a coupling assembly including a stage that couples the motor output to the object and a stage guide that guides the motion of the stage along the first axis and inhibits motion of the stage about a second axis that is orthogonal to the first axis.

4. The mover assembly of claim 1 further comprising a measurement system that provides information regarding the movement of the stage.

5. The mover assembly of claim 4 wherein the measurement system includes a first component that is secured to and moves with the stage.

6. A precision apparatus including an object and the mover assembly of claim 1.

7. A mover assembly that adjusts a position or shape of an object along a first axis, the mover assembly comprising:

a motor including a motor output that moves, wherein the motor output is moved along the first axis and about the first axis; and a coupling assembly including a stage that moves with the motor output, a stage guide that guides the motion of the stage along the first axis and inhibits motion of the stage about the first axis, and a measurement system that provides information regarding the movement of the stage, wherein the stage guide is a linear bearing that allows for motion of the stage along the first axis and inhibits motion of the stage about the first, about a second and third axes, along the second axis and along the third axis.

8. A mover assembly that adjusts a position or shape of an object along a first axis, the mover assembly comprising:

a motor including a motor output that moves along the first axis, wherein the motor output moves in a step-like fashion; and a coupling assembly including a stage that moves with the motor output, a stage guide that guides the motion of the stage along the first axis and inhibits motion of the stage about the first axis, a resilient member that urges the stage against the motor output, and a measurement system that provides information regarding the movement of the stage.

9. A mover assembly that adjusts a position or shape of an object along a first axis, the mover assembly comprising:

a motor including a motor output that moves and a pair of opposed jaw elements that engage the motor output, wherein the motor includes a piezoelectric element that causes rotation of the motor output by moving the jaw elements relative to each other; and a coupling assembly including a stage that moves with the motor output, a stage guide that guides the motion of the stage along the first axis and inhibits motion of the stage about the first axis, and a measurement system that provides information regarding the movement of the stage.

10. The mover assembly of claim 7 wherein the measurement system includes a first component that is secured to and moves with the stage.

11. A precision apparatus including an object and the mover assembly of claim 7.

12. A method for moving or positioning an object, the method comprising the steps of:

providing a motor and a motor output that is moved by the motor along a first axis;

coupling the motor output to the object with a stage; and guiding the motion of the stage along the first axis and inhibiting motion of the stage about a second axis that is orthogonal to the first axis with a stage guide.

13. The method of claim 12 wherein the step of guiding includes allowing for motion of the stage along the first axis and inhibiting motion of the stage about the first axis, about the second and a third axes, along the second axis and along the third axis.

14. The method of claim 12 further comprising the step of providing information regarding the movement of the stage with a measurement system.

15. The method of claim 14 wherein the step of providing information includes the step of coupling a first component of the measurement system to the stage so that the first component moves with the stage.

16. The mover assembly of claim 1 wherein the coupling assembly further includes a resilient member that urges the stage against the motor output.

17. The mover assembly of claim 16 wherein the motor output includes a bearing at one end that inhibits motion of the stage about the first axis, and wherein the resilient member urges the stage against the bearing.

18. The mover assembly of claim 8 wherein the motor output moves about the first axis.

19. The mover assembly of claim 8 wherein the motor output includes a bearing at one end that inhibits motion of the stage about the first axis, and wherein the resilient member urges the stage against the bearing.

* * * * *